Feb. 4, 1941. H. A. LUTTRUP 2,230,511
STAND FOR OFFICE USE
Filed Nov. 1, 1938
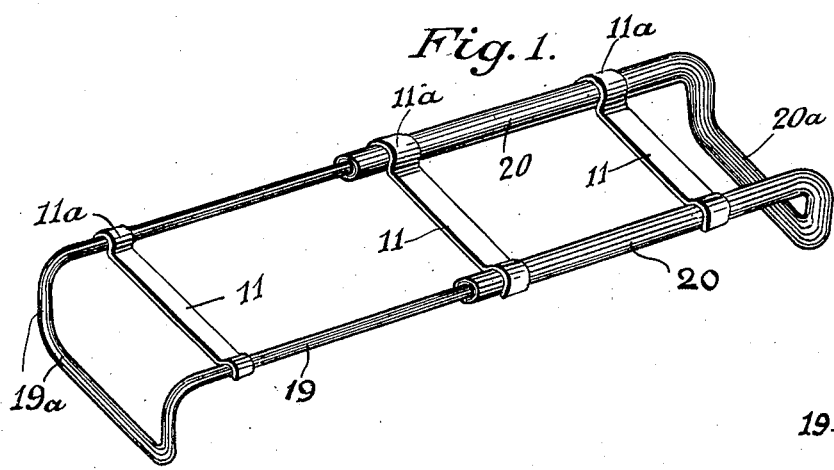
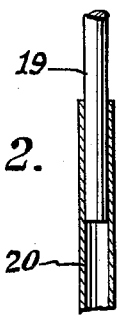
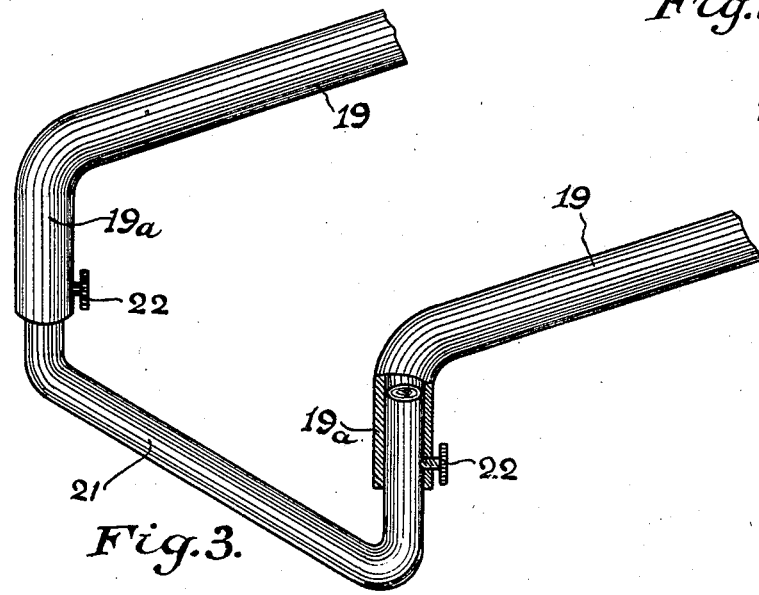

Patented Feb. 4, 1941

2,230,511

UNITED STATES PATENT OFFICE 2,230,511

STAND FOR OFFICE USE

Henry Anders Luttrup, Malmo, Sweden

Application November 1, 1938, Serial No. 238,147

1 Claim. (Cl. 248—19)

The present invention relates to improvements in such stands which are utilised in offices, and it is particularly concerned with a stand to support business machines, such as adding and calculating machines.

The primary object of the invention is to provide a base or stand which renders possible the placing of business machines of the kind referred to over a journal, ledger or similar accounting book, so as to be able to place the book under the machine at any desired column or place thereof and to also remove the book again without the necessity of moving the machine.

Another object of the invention is to provide means to adjust the height, length or width of the stand, so that it may be made suitable for all kinds of books of varying dimensions.

Still another object of the invention is to provide friction means in order to assure a firm and fixed position of the stand supporting the machine on the table.

These and other objects will become apparent upon a consideration of the detailed description, of the various embodiments thereof which follows.

The invention is illustrated in the accompanying drawing in which:

Fig. 1 is a perspective view of an adjustable stand constructed in accordance with the present invention;

Fig. 2 is a detail sectional view illustrating the manner of connecting the adjustable parts of the stand;

Fig. 3 is a detail perspective view of one end of one of the members of the adjustable frame illustrating a known method of effecting vertical adjustment as to height.

Similar reference characters designate corresponding parts throughout the several views.

According to the embodiment of the invention shown in Fig. 1, the stand is made of two pieces 19 and 20, the piece 19 consisting of rod or tubular material being adapted with its horizontal members to displaceably fit into the horizontal ends of the tubular piece 20. Fig. 3 shows, partly in section, the connection between the rod piece 19 and the tubular piece 20. The friction between these two pieces is sufficient to maintain the adjusted distance between the leg members of the stand. The upper parallel members of the stand have their end portions 19a and 20a bent downwardly to form supporting feet. Also the said parallel members are spanned by the transverse supporting strips 11 having substantially hooked ends 11a. The said strips 11 may be positioned at selected locations and in any desired number along the top rails 19 and 20 to support a machine. Because of the hook-like end portions 11a, the said members 11 also prevent spreading of the members 19 and 20 under load.

If it is desired to have the possibility of adjusting the height of the stand to suit books of different thicknesses, the stand is made of four pieces, i. e. two horizontal tubular members 8a with the end portions at both their ends 9 bent downwardly and two U-shaped members 21 of rod or tubular material the ends of which are adjustably fitted into the downwardly extending ends 9 of the horizontal members 8a, see Fig. 12. After pushing the members into each other so as to ascertain the desired height of the stand, the members are fixed relative each other by means of screws 22.

Although I have illustrated and described preferred embodiments of the invention, I am aware that many modifications can be made therein by any person skilled in the art without departing from the scope of the invention as expressed in the claims. Therefore I do not wish to be limited to all the details herein shown and described.

What I claim is:

As an article of manufacture, an office accessory, comprising a stand to support a business machine above a surface to afford space beneath the machine to accommodate an accounting book, said stand comprising laterally spaced apart horizontal members each composed of plural sections connected together for longitudinal adjustment relative to each other to vary the effective length of said horizontal members, depending legs at the ends of said horizontal members, and business machine supporting strips of flat cross-section spanning the space between said horizontal members and having angularly disposed end sections for slidably engaging and partially embracing the outer opposite sides of said members to avoid spreading under load, said strips being adjustable longitudinally with respect to the horizontal members, whereby a business machine may be directly mounted upon said supporting strips in different positions along the horizontal members of the stand and whereby the spaced apart relationship of the legs at the opposite ends of the stand may be varied to accommodate between them accounting books of different sizes regardless of the size of a business machine mounted upon said supporting strips and regardless of the position of adjustment of said supporting strips longitudinally along said horizontal members.

HENRY ANDERS LUTTRUP.